United States Patent Office 3,521,870
Patented July 28, 1970

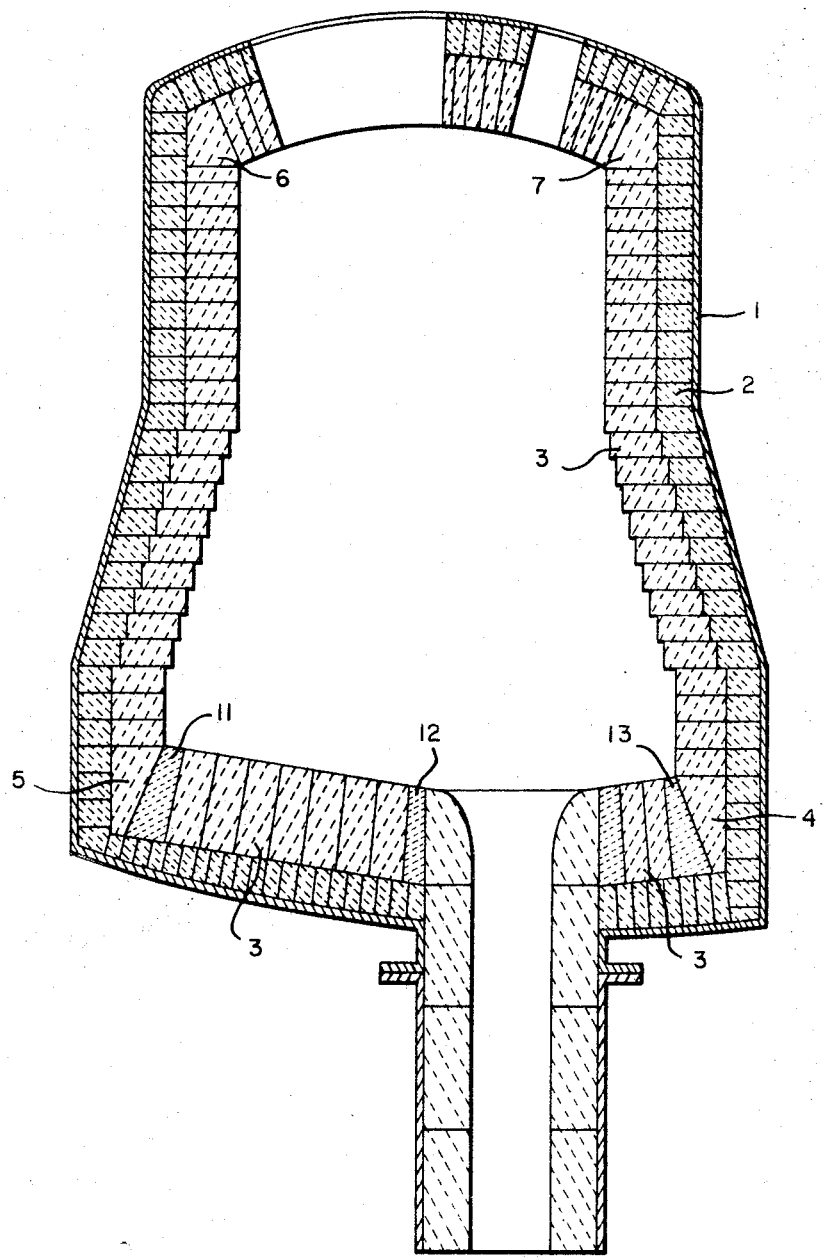

3,521,870
BASIC REFRACTORY MONOLITH
Thomas W. Lewis II, and George R. Henry, Bethel Park, Pa., assignors to Dresser Industries, Inc., Dallas, Tex., a corporation of Delaware
Continuation-in-part of applications Ser. No. 627,972, Apr. 3, 1967, and Ser. No. 679,238, Oct. 30, 1967, which are the continuations-in-part of application Ser. No. 573,159, Aug. 10, 1966, which in turn is a continuation-in-part of application Ser. No. 530,630, Feb. 28, 1966. This application May 16, 1969, Ser. No. 825,186
Int. Cl. F27d 1/00
U.S. Cl. 263—46  7 Claims

ABSTRACT OF THE DISCLOSURE

A vacuum degasser vessel having a lining comprised substantially of chemically basic brick shapes and monolithic portions, the monolithic portions consisting essentially of fused magnesite chrome ore grain having a magnesite chrome ore ratio between 30:70 and 70:30 and a suitable binder.

CROSS REFERENCES TO RELATED APPLICATIONS

This application is a continuation-in-part of U.S. applications Ser. No. 679,238, filed Oct. 30, 1967 and Ser. No. 627,972, filed Apr. 3, 1967 both of which are continuations-in-part of U.S. application Ser. No. 573,159, filed Aug. 10, 1966, which is a continuation in part of U.S. application Ser. No. 530,630, filed Feb. 28, 1966. All of the above applications have been abandoned.

BACKGROUND OF THE INVENTION

Vessels for handling molten metal and slag can either be lined with burned or chemically bonded brick or with a combination of both. Brick are desirable in a lining because they have uniformly good density. Burned brick are desirable because they have increased resistance to slag attack. Castables and ramming mixes known generally as monoliths are desirable because they are easily and economically emplaced.

Combined linings containing brick and monoliths are often used to avoid the tedious cutting and fitting required by all brick linings. These linings are usually designed so that the monolithic portion can be replaced several times during the life of the brick portion of the lining. This is not always possible. For example, the configuration of a vacuum degasser vessel does not easily permit replacement of the monolithic portions of its linings. Furthermore, any shutdown of a furnace is considered detrimental to the brick portion of the lining, especially basic brick which are more sensitive to heat shock than others. Therefore, it is an object of this invention to provide basic refractory monolith which has improved resistance to slag attack. It is an object of this invention to provide a vessel lining of basic refractory brick and a ramming mix which has uniform service life; that is, does not need to be shut down for repairs of the rammed portions before the brick portion is ready for replacement.

BRIEF DESCRIPTION

In order to more fully understand the nature and objects of the invention, reference should be made to the following detailed description and drawing, the single figure of which is an elevation view in cross-section of a typical vacuum degasser vessel. Briefly, according to this invention, a metal processing vessel is provided with a basic lining by using standard shapes, a minium of special shapes, and ramming into those portions of the lining which are not easily fitted with brick, a ramming mix consisting essentially of a size-graded fused magnesite-chrome ore grain having a chemical binder. The overall magnesia content of the monolith, excluding binders, is essentially less than 75%, by weight. The ratio of magnesite to chrome ore in the fused grain according to this invention is critical and varies from 30:70 to 70:30.

The fused grain should be sized and graded so that from about 40 to 60% is −4+10 mesh, about 20 to 30% is −10+65 mesh, and the remainder is ball mill fines (−65 mesh) of which about 30 to 70% is −325 mesh.

A small quantity of dead burned magnesite or chromic oxide may be added to the batch without adverse effects. By small quantity, we mean up to 10%, by weight.

The monolith has a suitable chemical binder, such as lignin extract, dextrine, or a polysaccharide gum. Any other well known organic binder is suitable including organic acids and salts thereof. Other suitable binders include alkali and alkaline earth salts of chromic, sulfuric, nitric, and carbonic acids. For example, nitre cake, Epsom salts, magnesium chloride hexahydrate, soda ash, calcium chloride, and sodium chromate are suitable chemical binders. Chromic acid is also suitable. Phosphates and silicates are not permissable as chemical binders according to this invention. Basic brick used in the practice of this invention are any of the well known magnesite or magnesite-chrome ore brick used throughout the steel making industry.

DETAILED DESCRIPTION OF THE INVENTION

Further features and other objects of the invention will become clearer to those skilled in the art by careful study of the following detailed description. In the specification and claims, all percentages and ratios and parts are by weight; chemical analyses were obtained by spectrographic analysis and controlled by wet chemical analysis, and are reported as oxides in accordance with the present practice of the refractories industry. All sizings are measured with Tyler Standard Screen Scale Sieve series.

Examples I and II

Two fused magnesite-chrome ore grains were prepared by blending magnesia and Transvaal chrome ore in the ratio 60:40 and 40:60 (Examples I and II, respectively). Typical chemical analysis of the raw materials used in the preparation of the fused grain is given in Table I.

TABLE I

| | Dead burned magnesite, percent | Transvaal chrome ore, percent |
|---|---|---|
| Silica (SiO$_2$) | 0.7 | 3.0 |
| Alumina (Al$_2$O$_3$) | 0.3 | 16.6 |
| Iron Oxide (Fe$_2$O$_3$) | 0.3 | 25.1 |
| Chromic Oxide (Cr$_2$O$_3$) | | 43.1 |
| Lime (CaO) | 0.7 | 0.5 |
| Magnesia (MgO) | (1) | 9.7 |
| Boron Oxide (B$_2$O$_3$) | <0.13 | |
| Loss on Ignition | | 0.9 |

[1] The remainder.

It is suitable according to this invention that any refractory chrome ore be used so long as it has a silica content of less than about 4%. Any source of magnesia is suitable so long as it has a silica content of less than 4%. The silica content of the fused magnesite-chrome ore grain should be less than 4% and, preferably, less than 2%. The grains are fused in electric arc furnaces in which they are rendered totally molten before being allowed to cool and resolidify.

The two fused grains were sized and batched as follows:

| | Percent by wt. |
|---|---|
| 4 on 10 mesh | 50 |
| 10 on 28 mesh | 10 |
| −65 mesh | 40 |

To the fused grain batches was added 2%, by weight, dextrine binder and 0.5% boric acid. The batches were tempered with 2.5% water. The tempered batches were rammed into monolithic shapes with pneumatic hammers according to practices well known in the art. The shapes were then dried.

Shapes according to Examples I and II and three typical basic brick (chemical analysis given in Table III) were subjected to a dynamic slag test to determine their relative resistance to a siliceous and ferruginous slag typical of those encountered in the steel making process. In this test, 1000 grams of molten slag of the composition given in Table II were dripped across samples inclined at 30° to the horizontal at 2900° F. The samples were thereafter evaluated for resistance to erosion and penetration by the slag.

TABLE II

| | Percent |
|---|---|
| Silica ($SiO_2$) | 26.2 |
| Alumina ($Al_2O_3$) | 5.5 |
| Iron oxide ($Fe_2O_3$) | 26.5 |
| Titania ($TiO_2$) | 0.7 |
| Lime (CaO) | 30.6 |
| Magnesia (MgO) | 6.5 |
| Manganese dioxide ($MnO_2$) | 4.3 |

The results of the slag testing are given in Table III, along with chemical analyses of the exemplary monolithic shapes and comparative brick.

TABLE III

| | Example I | Example II | Burned fused grain magnesite chrome brick | Burned direct bonded magnesite chrome brick | Typical unburned chrome magnesite brick |
|---|---|---|---|---|---|
| Magnesite: chrome ore ratio | 60:40 | 40:60 | | | |
| Drip Slag Test (2,900° F.) Using 1,000 grams of slag described in Table II: Volume Erosion, cc | 14 | 10 | 18 | 29 | (1) |
| Chemical Analysis, percent: | | | | | |
| Silica ($SiO_2$) | 0.96 | 0.58 | 1.3 | 1.5 | 5.7 |
| Alumina ($Al_2O_3$) | 6.5 | 8.5 | 6.6 | 9.1 | 21.1 |
| Iron Oxide (FeO and $Fe_2O_3$) | 11.8 | 15.0 | 11.7 | 4.9 | 11.1 |
| Lime (CaO) | 0.65 | 0.35 | 0.5 | 0.8 | 0.5 |
| Magnesia (MgO) | 60.2 | 44.7 | 62.1 | 73.3 | 32.8 |
| Chromic Oxide ($Cr_2O_3$) | 18.9 | 30.1 | 17.9 | 10.4 | 25.5 |
| Loss on Ignition | | | | | 3.3 |

[1] Unable to measure sample due to warping.

Monolithic shapes made according to Examples I and II are suitable for use in this invention. A vacuum degasser vessel comprising a monolith described in Example II is the preferred embodiment and the best mode now known for the practice of this invention. Table II establishes that the fused grain monolith according to this invention is as slag resistant, or even more slag resistant, than basic brick. The ramming mix was equal to or better in resistance to the burned fused grain magnesite-chrome brick having an identical composition. It was superior to direct bonded magnesite-chrome brick and far superior to typical unburned chrome-magnesite brick. Because of its unusual resistance, this ramming mix can be used in combination with brick linings without frequent periodic repair or replacement.

Example III

Monolithic shapes for use in this invention, were prepared in the same general manner as Examples I and II—from a fused grain having a magnesite:chrome ore ratio of 60:40—except that 5% chromic oxide was added to the batch (the chromic oxide was 100% −325 mesh). This addition increased the bulk density about 9 pounds per cubic foot. These shapes were pressed at 3000 p.s.i., which has been found roughly equivalent to ramming. In the drip slag test, a shape according to this example had an erosion loss of only 17 cc.

Example IV

A monolithic shape was prepared in the same manner as Example I, except that the dextrine was replaced by 4% sodium silicate glass. When subjected to the drip slag test, this shape was severely penetrated and eroded to a depth of 1 inch. Because the eroded portion of the brick was filled with a vesicular slag, a comparative volume eroded measurement could not be made. By way of comparison, however, Example I was only eroded to a depth of 3/8 inch. Example IV establishes that sodium silicate binders are unsuitable according to this invention. Sodium silicates react with the refractory grain to form a nonrefractory matrix. On the other hand, organic binders, sulfates, carbonates, nitrates, and chlorides vaporize on heating and do not affect the refractoriness of the brick. Chromates remain, but form a refractory bond. Phosphate binders are similar to silicates and, therefore, not suitable. In summary, the chemical binders suitable according to this invention are those organic or inorganic that do not react with the fused grain to form a nonrefractory matrix. Binders used for bonding monolithic refractories are well known to those skilled in the art and described, for example, in Chapter 18 of Ceramic Fabrication Processes, edited by Kingery, John Wiley & Sons, Inc., New York (1958).

Example V

A fused grain was prepared with a magnesite:chrome ore ratio of 80:20 from the same raw materials used in preparing the grains used in Examples I and II. A monolithic shape was prepared in the same way as in Example I and subjected to the drip slag test. In the slag test this shape lost 27 cc. by erosion (notice that this is more or less twice the erosion loss of Examples I and II). Example V establishes that the magnesite:chrome ore ratio of the fused grain is critical.

Referring to the drawing, there is shown a typical vacuum degasser vessel which consists of an outer metal shell 1, an adjacent insulating refractory lining 2, and a brick lining 3. The brick lining consists primarily of standard shapes. Special shapes are used in locations 4, 5, 6, and 7. However, there remains areas which are not easily filled by cutting and fitting brick. These areas (11, 12 and 13) are rammed with a fused magnesite-chrome ramming mix.

A lining made according to the practice of this invention is superior to prior art linings for several reasons. It is more easily installed because tedious cutting and fitting of the brick is avoided. This advantage is gained without losing lining life, because the furnace does not have to be shut down to repair or replace the rammed portions, thereby subjecting the brick lining to harmful thermal shock effects.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. A vacuum degasser vessel having a lining substantially comprised of chemically basic refractory brick and monolithic portions, the monolithic portions being in position to be exposed to attack by siliceous and ferruginous slags, said monolithic portions consisting essentially of fused magnesite-chrome ore grain having a magnesite chrome ore ratio between 30:70 and 70:30, up to 10% chromic oxide, up to 10% magnesite, and a chemical binder that does not react with the fused grain on heating to form a nonrefractory matrix, the total magnesia content of the monolith, excluding binders, being less than 75%, by weight.

2. The vacuum degasser vessel according to claim 1 in which the binder is selected from the group consisting of soluble alkali and alkaline earth salts of sulfuric, carbonic, chromic, nitric, and hydrochloric acid.

3. The vacuum degasser vessel according to claim 1 in which the fused grain constitutes about 97% of the batch.

4. The vacuum degasser vessel according to claim 1 in which the fused grain is sized so that about 40 to 60%, by weight, is −4+10 mesh, about 20 to 30% is −10+65 mesh, and the remainder is −65 mesh of which about 30 to 70% is −325 mesh.

5. The vacuum degasser vessel according to claim 1 in which the batch contains up to about 0.2% boric acid.

6. The vacuum degasser vessel according to claim 1 in which the binder is an organic binder.

7. The vacuum degasser vessel according to claim 1 in which the binder is chromic acid.

References Cited

UNITED STATES PATENTS

| | | | |
|---|---|---|---|
| 3,116,156 | 12/1963 | Charrat | 106—59 |
| 3,403,213 | 9/1968 | Taylor et al. | 263—46 |
| 3,429,565 | 2/1969 | Napora | 266—43 |

JOHN J. CAMBY, Primary Examiner

U.S. Cl. X.R.

13—35; 266—43